United States Patent [19]
Alling et al.

[11] Patent Number: 5,404,642
[45] Date of Patent: Apr. 11, 1995

[54] METHOD OF ASSEMBLING A BEARING

[75] Inventors: Richard L. Alling; Gunter J. Zinken, both of Torrington, Conn.

[73] Assignee: The Torrington Company, Torrington, Conn.

[21] Appl. No.: 189,955

[22] Filed: Jan. 31, 1994

[51] Int. Cl.6 .............................................. B23P 15/00
[52] U.S. Cl. ........................... 29/898.067; 29/898.044; 29/898.064
[58] Field of Search .............. 29/894.044, 898.06, 29/898.061, 898.067, 898.064, 898.062, 465; 72/379.2

[56] References Cited

U.S. PATENT DOCUMENTS

| | | | |
|---|---|---|---|
| 918,785 | 4/1909 | Sonnberg | 29/898.061 |
| 1,197,466 | 9/1916 | Englerth et al. | 29/898.067 |
| 1,481,000 | 1/1924 | Erickson | 29/898.067 |
| 1,496,516 | 6/1924 | Betz . | |
| 1,537,590 | 5/1925 | Dlesk, Jr. | 29/898.064 |
| 1,543,320 | 6/1925 | Cofrancesco et al. . | |
| 1,598,025 | 8/1926 | Stevens | 29/898.067 |
| 1,759,234 | 5/1930 | Layne | 72/385 |
| 1,762,891 | 6/1930 | Rouanet . | |
| 2,146,440 | 2/1939 | Pew | 29/148.4 |
| 2,458,762 | 1/1949 | Barnbrook | 113/117 |
| 2,702,216 | 2/1955 | Stearns | 29/898.061 |
| 2,931,095 | 4/1960 | Esken | 29/898.061 |
| 3,054,164 | 9/1962 | Recknagel | 29/898.062 |
| 3,374,524 | 3/1968 | Sutowski | 29/898.062 |
| 3,918,777 | 11/1976 | Kitchin | 29/898.067 |
| 4,126,362 | 11/1978 | Hamblin et al. | 29/898.067 |
| 4,322,878 | 4/1982 | Warchol | 29/898.067 |
| 5,291,655 | 3/1994 | Benson et al. | 29/898.067 |

FOREIGN PATENT DOCUMENTS

| | | | |
|---|---|---|---|
| 1391994 | 2/1965 | France | 72/379.2 |
| 0000315 | 1/1963 | Japan | 29/898.062 |
| 0419570 | 11/1934 | United Kingdom | 29/898.062 |

Primary Examiner—Irene Cuda
Assistant Examiner—Marc W. Butler
Attorney, Agent, or Firm—John C. Bigler

[57] ABSTRACT

A flat, thin ring is formed into a modified ring having bridge material between adjacent, initial ball pockets. Movable anvils having a rounded surface are positioned within the initial ball pockets and the bridge material is reformed such that a substantially flat bridge is formed between adjacent final ball pockets conforming to more than a 180 degree circumference of the rounded surface. The movable anvils are then moved such that the final ball pockets do not conform to more than a 180 degree circumference of the rounded surface to facilitate removal of the movable anvils from the final ball pockets. A method of assembling a ball bearing assembly is also described.

2 Claims, 4 Drawing Sheets

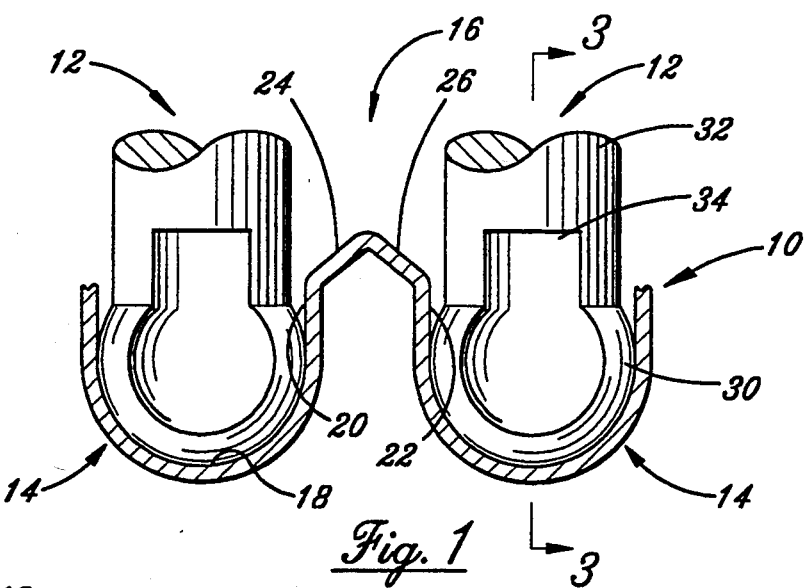
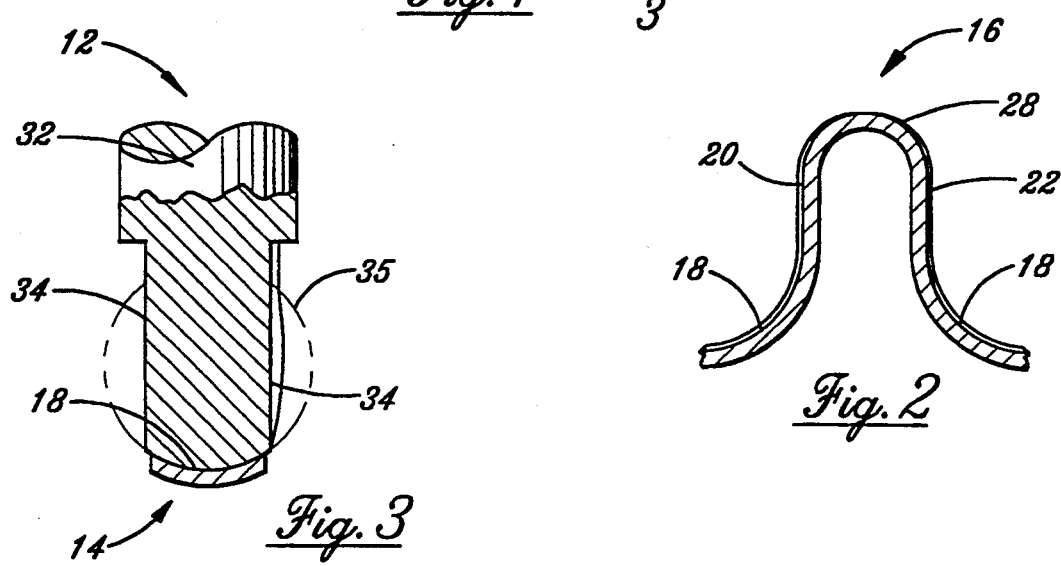
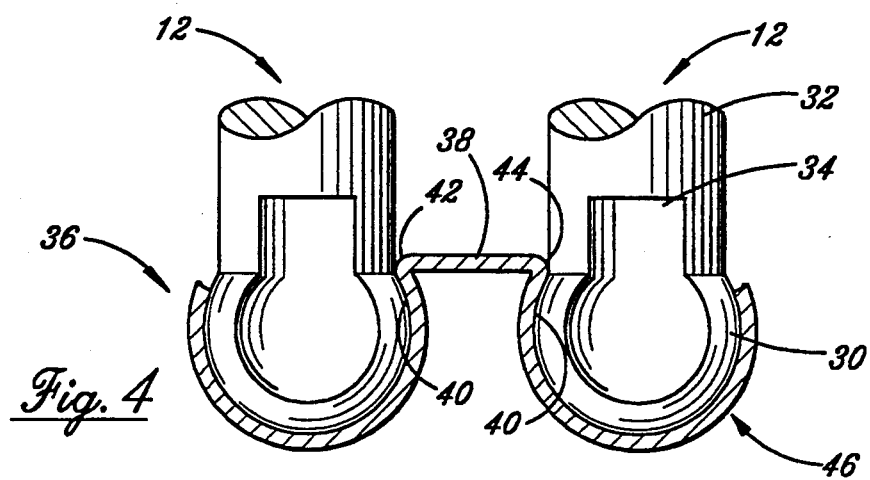

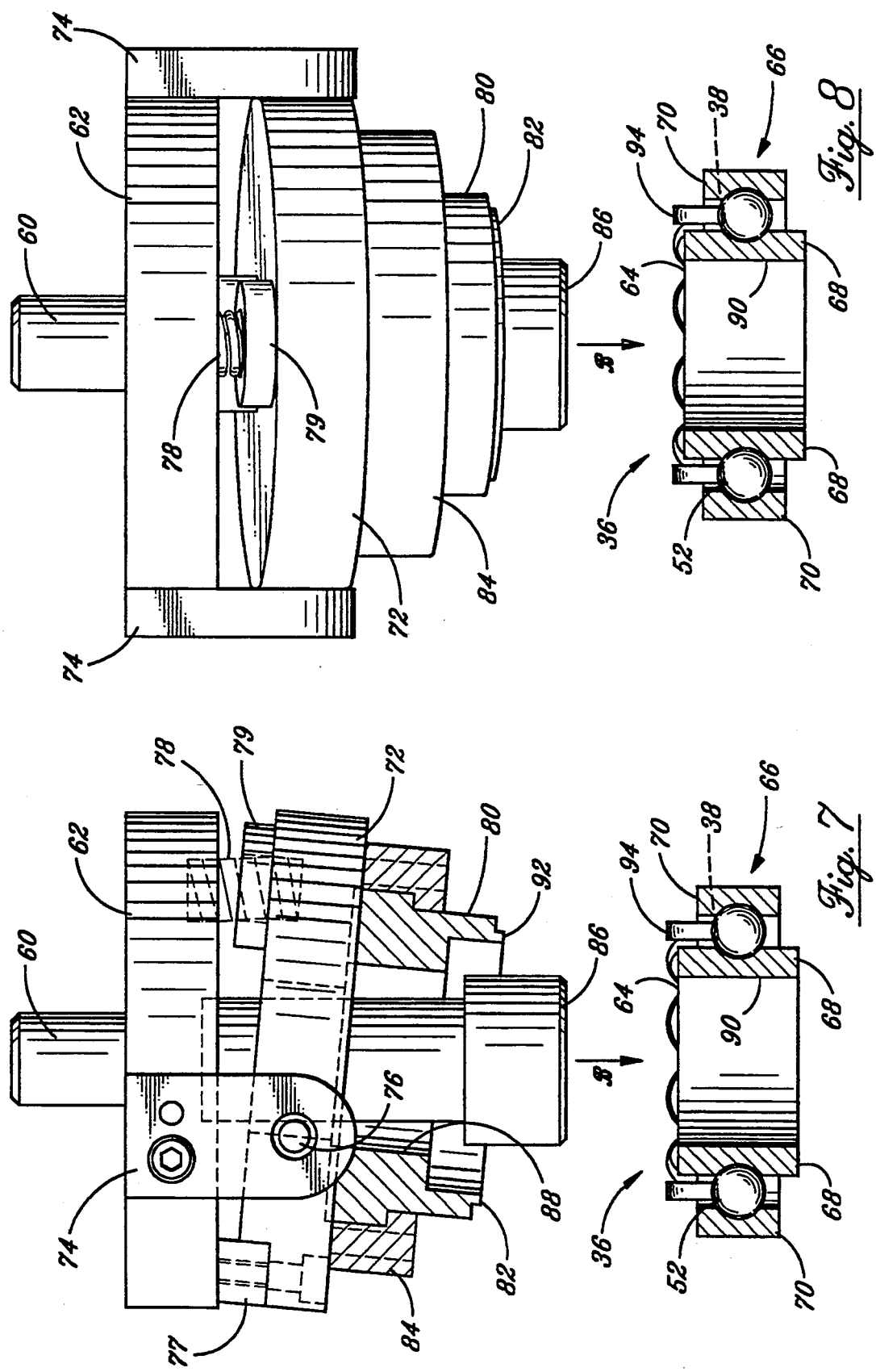

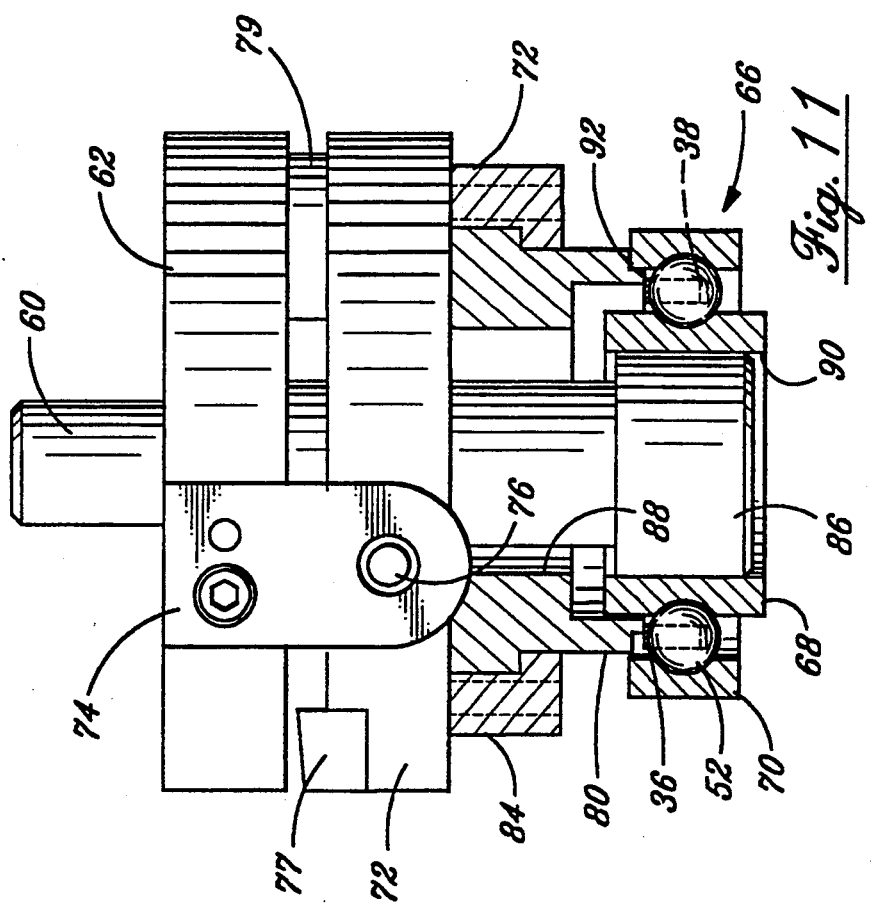
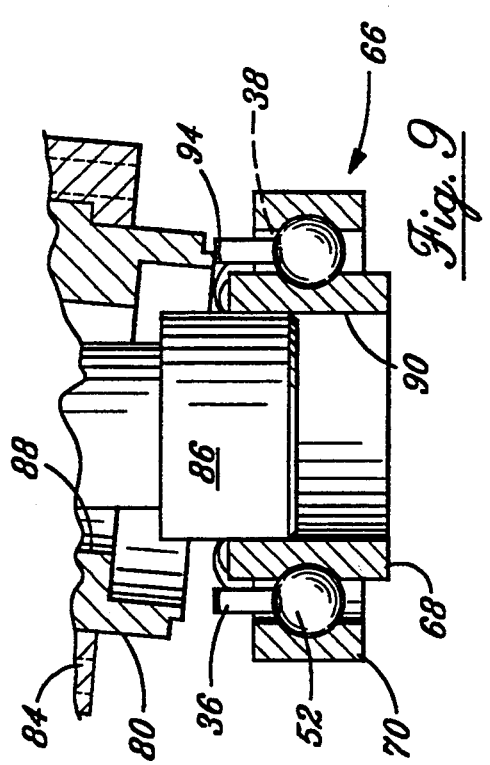
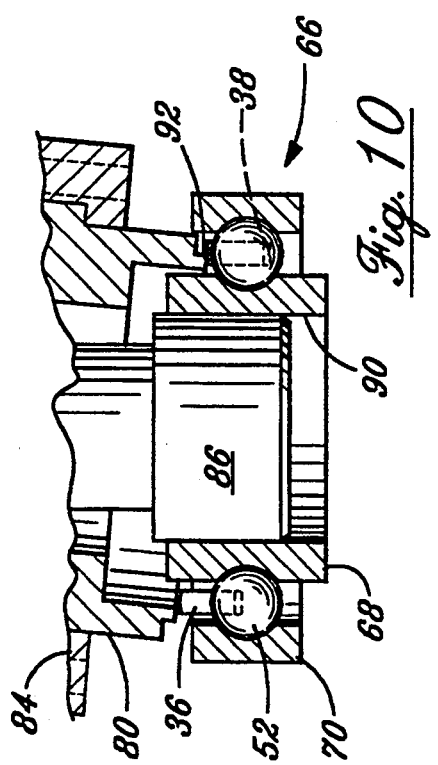

5,404,642

METHOD OF ASSEMBLING A BEARING

BACKGROUND OF THE INVENTION

This invention relates generally to ball bearing cages and, more particularly, to one-piece ball bearing cages that are installed in a ball bearing assembly by "popping" or "snapping" over bearing balls.

One common type of ball bearing cage comprises two halves joined together by welding, riveting or mechanical interlock. These two-piece ball bearing cages require insertion of the two halves from opposite ends of the ball bearing after the bearing balls have been loaded between the bearing rings. Welding is difficult due to potential arcing through the bearing balls, and riveting is difficult due to the many small rivets that must be inserted. Additional cost results from inspection and rejection of defective bearing assemblies.

Additional problems are associated with two-piece ball bearing cages due to space requirements. Such ball bearing cages require sufficient circumferential distance between bearing balls to permit welding, riveting or mechanical interlock of the two halves. As a result, fewer bearing balls may be inserted, reducing the load capacity of the bearing assembly. Also, when multiple rows of bearing balls are used, the rows must be separated to provide space for the ball bearing cages, adding to the axial length of the bearing assembly.

Another type ball bearing cage comprises a sheet metal ring having an initial undulatory configuration with open ball pockets spaced apart by U-shaped connecting portions. After being inserted between the bearing rings, with bearing balls placed in the pockets, the U-shaped connecting portions are upset, causing the sides of the connecting portions to spread and conform to the contour of the bearing balls. However, forming the ball bearing cages directly against the bearing balls often results in excess gripping of the bearing balls or in insufficient ball retention.

Ball bearing cages may also employ a one-piece design having resilient fingers or lips which snap over the bearing balls as the bearing balls enter the ball pockets to provide a simple pop-in assembly. Such one-piece ball bearing cages are difficult to form of metal with sufficient ball contacting surface to retain the bearing balls. Molded polymer ball bearing cages of similar one-piece pop-in design may provide improved wrap-around and ball conformity. However, such polymer ball bearing cages are limited to low temperature and low strength applications.

The foregoing illustrates limitations known to exist in present ball bearing cages. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method of forming a one-piece metallic ball bearing cage. A flat, thin ring is formed into a modified ring having bridge material between adjacent, initial ball pockets. Movable anvils having a rounded surface are positioned within the initial ball pockets and the bridge material is reformed such that a substantially flat bridge is formed between adjacent final ball pockets conforming to more than a 180 degree circumference of the rounded surface. The movable anvils are then moved such that the final ball pockets do not conform to more than a 180 degree circumference of the rounded surface to facilitate removal of the movable anvils from the final ball pockets.

In another aspect of the present invention, this is accomplished by providing a method of assembling a ball bearing assembly.

The foregoing and other aspects will become apparent from the following detailed description of the invention when considered in conjunction with the accompanying drawing figures.

BRIEF DESCRIPTION OF THE DRAWING FIGURES

FIG. 1 is a cross-sectional view illustrating tooling and a portion of a partially formed one-piece ball bearing cage of the present invention;

FIG. 2 is a cross-sectional view illustrating an alternative bridge portion of a partially formed one-piece ball bearing cage of the present invention;

FIG. 3 is a sectional view along the line 3—3 of FIG. 1 illustrating the tooling and a portion of the partially formed one-piece ball bearing cage;

FIG. 4 is a cross-sectional view illustrating tooling and a portion of a fully formed one-piece ball bearing cage of the present invention;

FIG. 7 is an elevational view, partially in section, illustrating a partially assembled ball bearing assembly and tooling for inserting the ball bearing cage;

FIG. 8 is a side view, partially in section, of the partially assembled ball bearing assembly and tooling of FIG. 7;

FIG. 9 is an elevational view illustrating a subsequent position of the partially assembled ball bearing assembly and portions of the tooling of FIG. 7;

FIG. 10 is an elevational view illustrating a subsequent position of the partially assembled ball bearing assembly and tooling of FIG. 8; and FIG. 11 is an elevation view similar to FIG. 7 illustrating a subsequent position of the ball bearing assembly and tooling of the present invention.

Elements which are similar in the various embodiments of the present invention are indicated by the same reference numeral in the figures.

DETAILED DESCRIPTION

Figure 5:
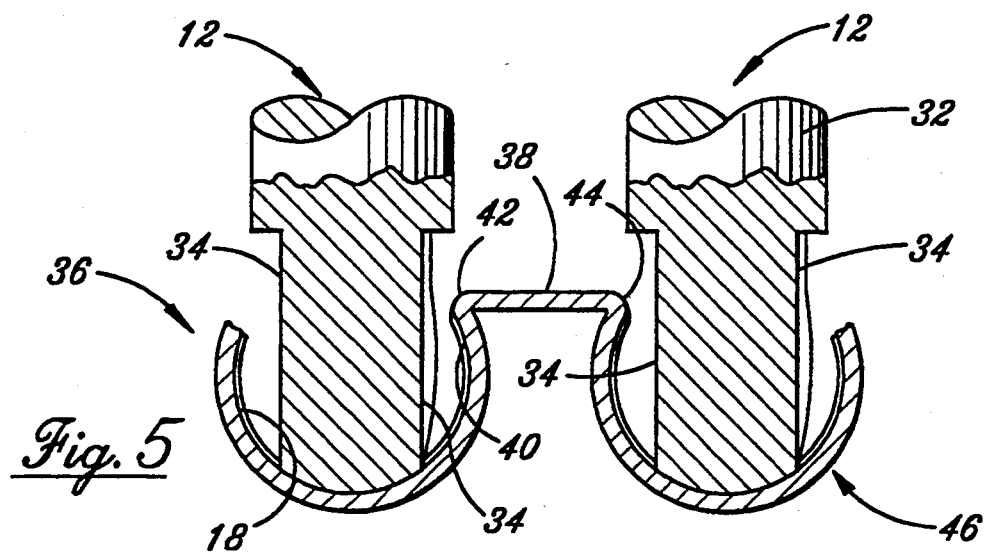
FIG. 5 is a cross-sectional view similar to FIG. 4 illustrating a subsequent position of the tooling relative to the fully formed one-piece ball bearing cage.

Referring now to the drawings, FIG. 1 illustrates a portion of a partially formed one-piece ball bearing cage 10 and tooling, comprising movable anvils 12, of the present invention that may be used to complete a fully formed one-piece ball bearing cage.

To form partially formed ball bearing cage 10, a flat, thin ring of metal is first formed using any known forming method. For example, the flat ring may be stamped or punched as a "washer" from a wide strip of sheet of flat metal. Alternatively, the flat ring may be formed from a narrow flat strip of metal which is coiled edgewise ("the hard way") into a split ring. The ends of the split ring may be joined by welding or other means, with a butt, puzzle-cut or lap joint, coined to an even thickness and trimmed to size to provide a uniform section.

Next, the flat, thin ring is modified into partially formed ball bearing cage 10 by forming initial ball pockets 14 and bridge material 16 between adjacent, initial ball pockets 14. Conventional multistage dies or other means may be used to progressively gather the thin ring into an undulating configuration as the overall diameter of the ring is reduced. Subsequent die stages may progressively form initial ball pockets 14 and bridge material 16. Preferably, initial ball pockets 14 have a spherically concave bottom surface 18 to conform to a bearing ball; however, other concave configurations may be used with similar effect.

Side walls 20 and 22 of initial pocket portions 14 are not spherically concave, thus facilitating use of conventional multi-stage dies. Bridge material 16 may include flat portions 24 and 26 providing a tent or peaked configuration, as shown in FIG. 1, or may have rounded portion 28 providing a curved arch configuration, as shown in FIG. 2. Flat portions 24 and 26 or rounded portion 28 extend upward from side walls 20 and 22 to provide sufficient material to form a desired bridge configuration of the finished ball bearing cage, as described below.

Movable anvils 12 are positioned within initial ball pockets 14. Preferably, rounded surface 30 of movable anvils 12 defines a band of a sphere having a diameter slightly greater than that of the bearing balls with which the finished ball bearing cage is to be used, to ensure that the bearing balls are freely rotatable. Rounded surface 30 is mounted on anvil post 32, which may be cylindrical. As shown in FIG. 3, movable anvils 12 include recessed side portions 34 that are recessed with respect to spherical extension 35 of rounded surface 30 to provide an overall "lollipop" shape. Recessed side portions 34 may be flat or may be cylindrically curved, as shown, to conform to the bore and outside diameter of the ball bearing cage.

As shown in FIG. 4, fully formed ball bearing cage 36 is formed by flattening bridge portion 16 (FIGS. 1 and 2) with suitable dies to form flat bridge 38 and to cause side walls 20 and 22 (FIGS. 1 and 2) to wrap around rounded portion 30, forming curved upper walls 40. Bridge ends 42 and 44 are spread against anvil posts 32, which provide stop surfaces limiting the length of flat bridge 38, ensuring that final ball pockets 46 enclose more than a 180 degree circumference of rounded surface 30. As a result, final ball pockets 46 retain bearing balls both axially and radially with respect to the ball bearing cage.

Flattening of bridge portion 16 between initial ball pockets 14 (FIG. 1) thus creates a narrowed access to final ball pockets 46 to achieve the desired retainment feature. The bore and outside diameter of partially formed ball bearing cage 10 (FIG. 1) are contained during this bridge flattening operation in order to prevent radial growth or undesirable distortion of the ball bearing cage. Anvil posts 32 provide a controlled clearance between bridge ends 42 and 44 of each final ball pocket 46 to ensure that a desired amount of force is required to remove the bearing cage from a ball bearing assembly.

To facilitate removal of movable anvils 12 from fully formed ball bearing cage 36 without distorting the ball bearing cage, the anvils are moved by rotation about axes perpendicular to the ball bearing cage or by another form of motion, for example, by tilting movable anvils 12, such that final ball pockets 46 no longer enclose more than a 180 degree circumference of rounded surface 30 of movable anvils 12. For illustrative purposes only, FIG. 5 shows movable anvils 12 rotated 90 degrees relative to their position in FIG. 4; generally, a rotation of 30 degrees is sufficient. The rotation of the anvils may be effected by a ring gear and pinions or by other known means.

Figure 6:
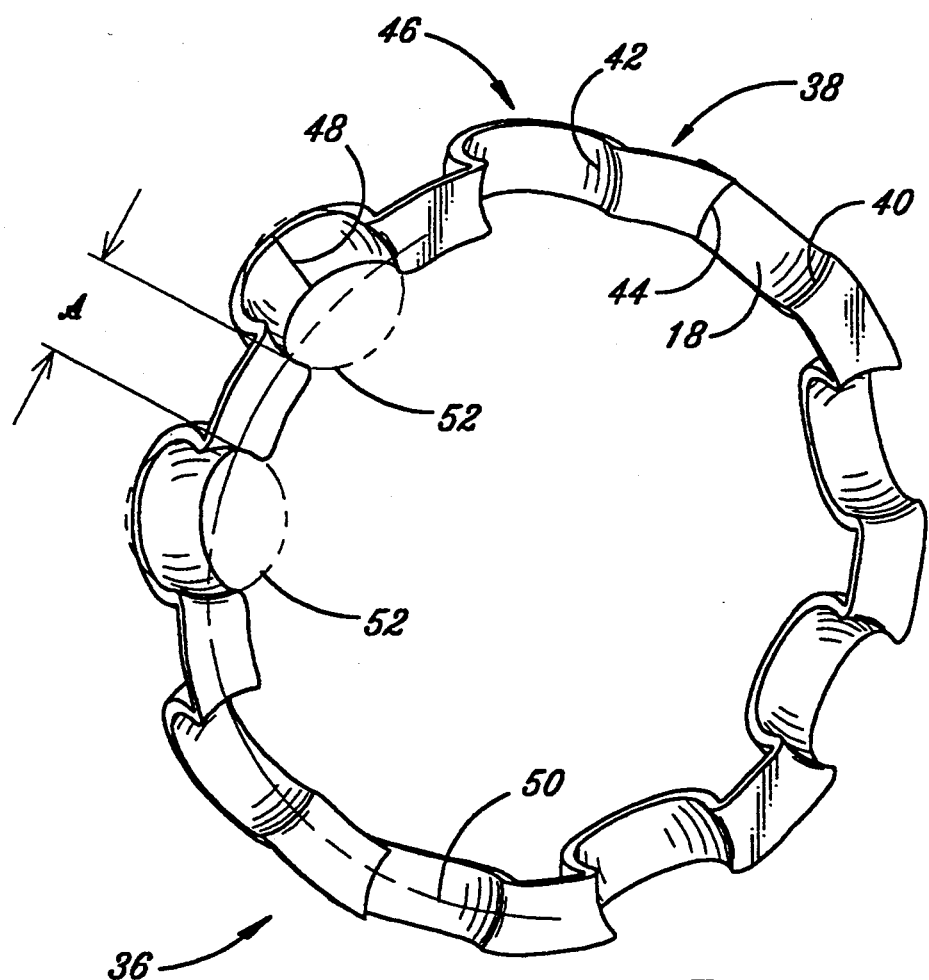
FIG. 6 is a pictorial view illustrating the fully formed one-piece ball bearing cage of the present invention.

FIG. 6 shows fully formed ball bearing cage 36 after removal of movable anvils 12. If the flat, thin ring is formed from a split ring, as described above, weld joint 48 is preferably located in final ball pockets 46, as shown, rather than in flat bridge 38, to improve resistance to fatigue. At least one flat bridge 38 has predetermined chordal length A, measured at pitch circle 50 of bearing balls 52, which is greater than the space between adjacent bearing balls 52. As a result, fully formed ball bearing cage 36 must be deformed to allow adjacent bearing balls 52 to pass between bridge ends 42 and 44 and enter final ball pockets 46.

The ball bearing cage may be formed of steel, brass, bronze or similar metal. If a relatively soft material is used, the number of pressing stages required to form partially formed ball bearing cage 10 and fully formed ball bearing cage 36 may be reduced. For example, initial ball pockets 14 of partially formed ball bearing cage 10 may have a simplified curved surface, and rounded portion 30 of movable anvils 12 may serve as a die to form spherically concave bottom surface 18 in addition to their function in forming flat bridge 38 and curved upper walls 40.

Fully formed ball bearing cage 36 should have sufficient resiliency to snap back to its fully formed configuration after being deformed during installation of bearing balls 52 in final ball pockets 46, to provide a pop-in installation. If the ball bearing cage is formed of mild steel, carburizing, hardening and tempering of fully formed ball bearing cage 36 may be employed to create residual compressive stress and improve resiliency and fatigue resistance. Preferably, carburizing does not exceed one-third the thickness of the ball bearing cage and tempering ensures that the surface of the cage is softer than the surface of bearing balls 52.

FIGS. 7 and 8 illustrate tooling that may be used to insert fully formed ball bearing cage 36 to complete a ball bearing assembly. Top plate shank 60 is mounted in a vertical press such that top plate 62 is movable vertically, perpendicular to bearing end face 64 of ball bearing 66, as shown by arrow B. Bearing balls 52 are within an annulus between inner and outer bearing rings 68 and 70 and are separated by an average chordal distance less than the chordal length of at least one flat bridge 38. Ball bearing 66 may be the type with a wide inner bearing ring 68 relative to outer bearing ring 70, as illustrated, or may be of other configurations.

Pivot plate 72 is pivotably mounted on opposite sides of top plate 62 by means of trunnion blocks 74 and trunnion pins 76. Pivot plate 72 includes stop bar 77 and stop washer 79 and is biased by compression spring 78, or by other biasing means, against top plate 62 into the position illustrated in FIG. 7. Loading punch 80 includes ring shaped shoulder 82 and is fixed to pivot plate 72 by clamps 84 at opposite sides of pivot plate 72. Center pilot 86 is fixed to top plate 62 and extends through bore 88 in loading punch 80 and a corresponding bore in pivot plate 72.

FIGS. 8 through 11 illustrate subsequent positions of the tooling and ball bearing assembly of FIG. 7. The vertical press moves top plate shank 60, top plate 62 and center pilot 86 vertically, as a unit, such that center pilot 86 is advanced into bore 90 of inner bearing ring 68, as illustrated in FIG. 9, thereby maintaining proper alignment of ball bearing 66. Shoulder portion 92 of loading punch 80 then engages cage portion 94, as illustrated in FIG. 10, such that adjacent bearing balls 52 move circumferentially, along pitch circle 50, allowing adjacent flat bridge 38 to pass between bearing balls 52 as the balls enter final ball pockets 46.

After this initial insertion of cage portion 94, further advancement of the tooling compresses compression spring 78 and pivots loading punch 80 such that additional portions of fully formed ball bearing cage 36 are pressed downward against bearing balls 52. Bearing balls 52 move circumferentially, along pitch circle 50, allowing the balls to enter the remaining final ball pockets 46. Insertion is said to be "sequential" because bearing balls 52 do not all enter the ball pockets simultaneously, that is, at least one bearing ball 52 (for example, a bearing ball adjacent cage portion 94) precedes the others, which may or may not enter simultaneously.

Although a simple pivoted loading punch is illustrated, having an abutment surface initially angled and subsequently parallel with respect to bearing end face 64, other types of tooling may be used to press the ball bearing cage and force flat bridges 38 between adjacent bearing balls. For example, a V-shaped or curved abutment surface may be pressed against two cage portions to initially insert bearing balls 52 at those two cage portions rather than at single cage portion 94. Ball bearing cage 36 may remain substantially as shown in FIG. 6 during insertion, or may be temporarily bent to a "potato chip" configuration to facilitate insertion over bearing balls 52.

Fully formed ball bearing cage 36 is made of a resilient material such that it returns to its fully formed configuration after bearing balls 52 enter final ball pockets 46 to provide a pop-in assembly. Because at least some of flat bridges 38 are longer than respective spaces between bearing balls 52, bridge ends 42 and 44 are engageable with bearing balls 52 to prevent ball bearing cage 36 from separating from bearing balls 52 in an axial direction with respect to ball bearing 66. Preferably, final bridge pockets 46 have a substantially spherical concave surface for receiving a circumferential portion of the respective bearing ball and have a slightly larger diameter to provide free rotation.

From the above description, it will be apparent that flattening of bridge material 16 between and above the midpoint of open, loop-shaped initial ball pockets 14 ensures that final ball pockets 46 have a narrowed opening to retain fully formed ball bearing cage 36. Movable anvils 12 provide a controlled interference fit with respect to bearing balls 52 during insertion and a controlled clearance after insertion of ball bearing cage 36 within ball bearing 66 to form a ball bearing assembly. Excess gripping of bearing balls 52 and insufficient retention are thereby prevented.

The present invention provides a pop-in ball bearing cage having improved performance as well as reduced manufacturing cost. Because joining of cage halves is not required, costs and defects associated with welding and riveting halves are eliminated. Ball pockets may be made closer together, allowing a greater number of bearing balls in a bearing assembly of a given size, thereby increasing load capacity, and closer spacing of rows of a two row ball bearing is permitted than with two-piece ball bearing cages. Better lubrication results from increased space for holding grease, and higher temperature applications are possible than with polymer ball bearing cages.

Having described the invention, what is claimed is:

1. A method of assembling a ball bearing assembly, the method comprising the steps of:

forming a one-piece metallic ball bearing cage having ball pockets and bridge portions between the ball pockets, at least some of the bridge portions having a predetermined chordal length;

positioning bearing balls within an annulus between inner and outer bearing rings, the inner and outer bearing rings defining a bearing end face, the bearing balls being separated by an average chordal distance less than said predetermined chordal length; and forcing a first bridge portion between adjacent bearing balls and subsequently moving the ball bearing cage such that bearing balls move circumferentially and other bridge portions are forced, sequentially, between bearing balls, aided by an insertion tool having an abutment surface which is initially angled with respect to the bearing end face and which is subsequently moved parallel to the bearing end face.

2. The method of assembling a ball bearing assembly according to claim 1, wherein the insertion tool includes biasing means for biasing the abutment surface into an angled initial position and wherein advancement of the insertion tool, axially with respect to the inner and outer bearing rings, causes the abutment surface to engage the ball bearing cage and overcome the biasing of the biasing means to move the abutment surface to a subsequent position parallel to the bearing end face.

* * * * *